S. SUNDERLAND.
GEAR CUTTING MACHINE.
APPLICATION FILED DEC. 22, 1908.
948,830.
Patented Feb. 8, 1910.
5 SHEETS—SHEET 5.
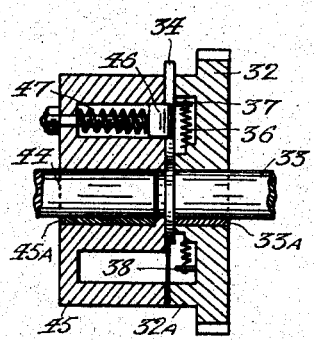
Fig. 6.
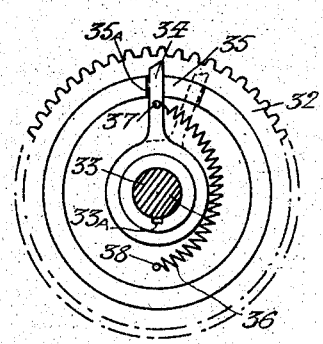
Fig. 8.
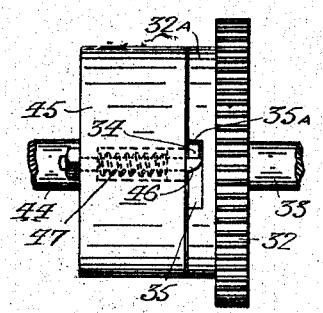
Fig. 7.
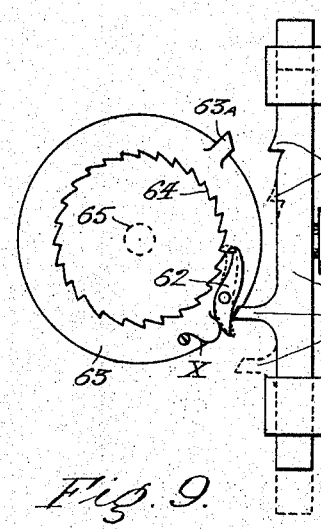
Fig. 9.
Fig. 10.
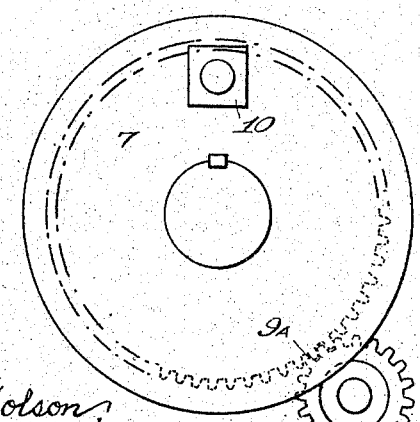
Fig. 11.
Attest:
Ewd L. Tolson
Edward N. Santon
Inventor:
Sam Sunderland,
By Spear, Middleton, Donaldson & Spear
Attys

UNITED STATES PATENT OFFICE.

SAM SUNDERLAND, OF KEIGHLEY, ENGLAND.

GEAR-CUTTING MACHINE.

948,830.  Specification of Letters Patent.  Patented Feb. 8, 1910.

Application filed December 22, 1908. Serial No. 468,791.

*To all whom it may concern:*

Be it known that I, SAM SUNDERLAND, a subject of the King of Great Britain and Ireland, and resident of 132 Highfield Lane, Keighley, in the county of York, England, have invented a certain new and useful Improvement in and Relating to Gear-Cutting Machines, of which the following is a specification.

This invention relates to the cutting of teeth in spur and spiral toothed gears, and the object is to so form and control the cutter that it is applicable for cutting teeth of the same pitch in gears of all diameters; also to operate the reciprocating and vertical movements of the cutter so that on the periodical stoppage of rotation and backward sliding movement of blank from cutter, for the cutter to be lowered quickly, and the blank retained until the cutter is raised into the position for the blank to reëngage therewith when moved back and put into rotary operation in unison with the upward sliding movement of the reciprocating cutter, for another series of cuts.

The accompanying drawings illustrate a suitable arrangement for carrying out the invention.

Figure 1:
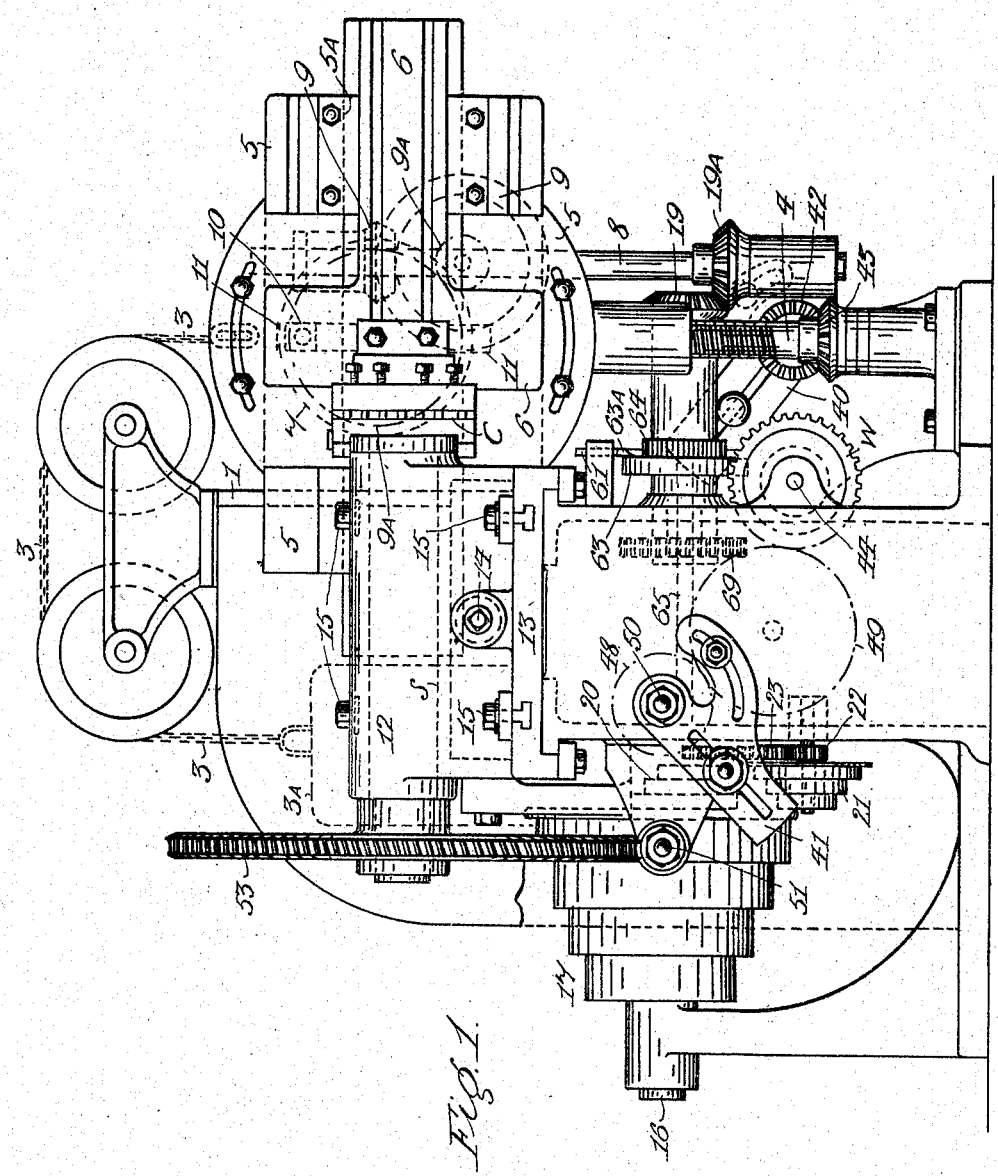
Figure 2:
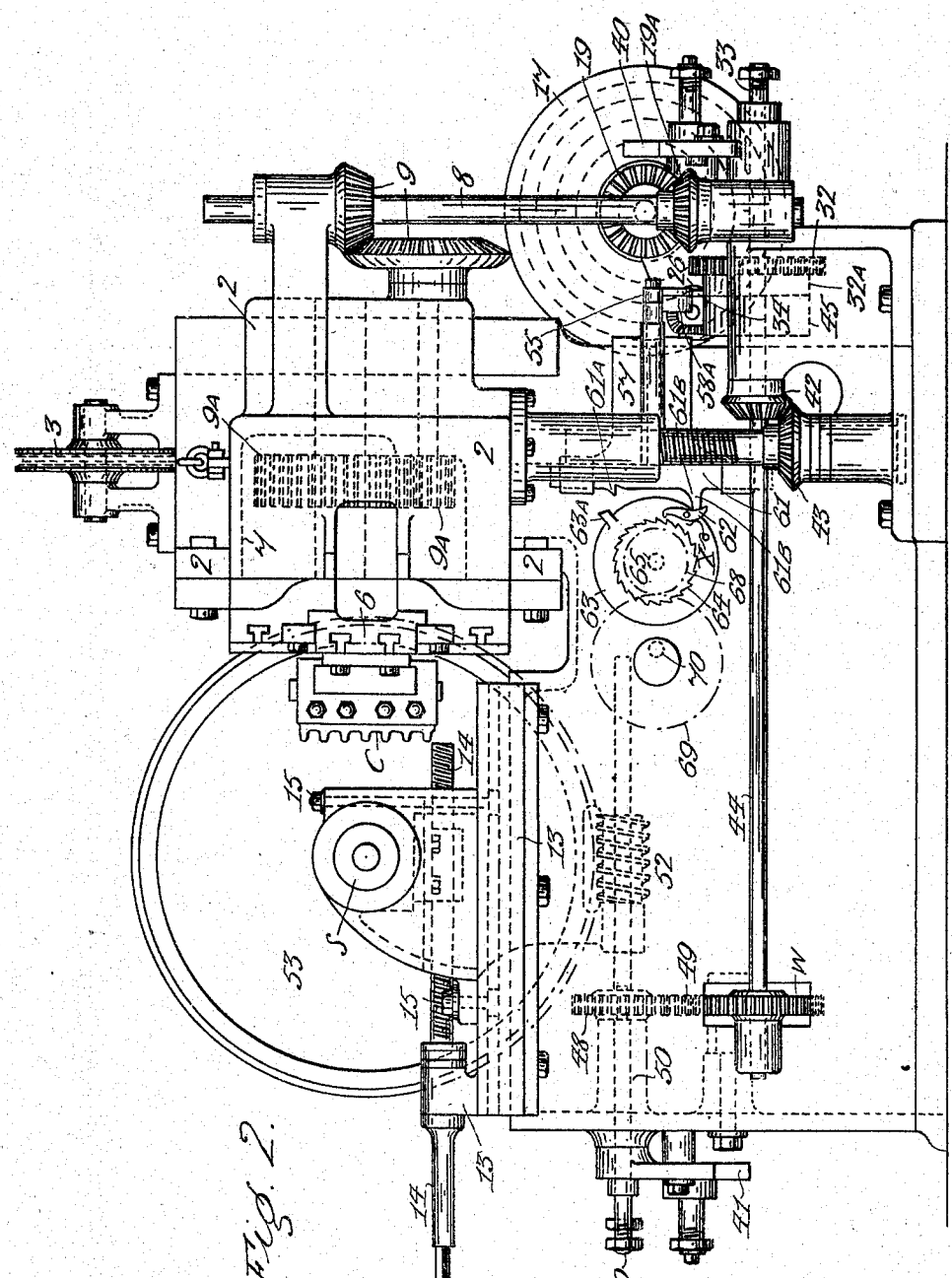
Figure 3:
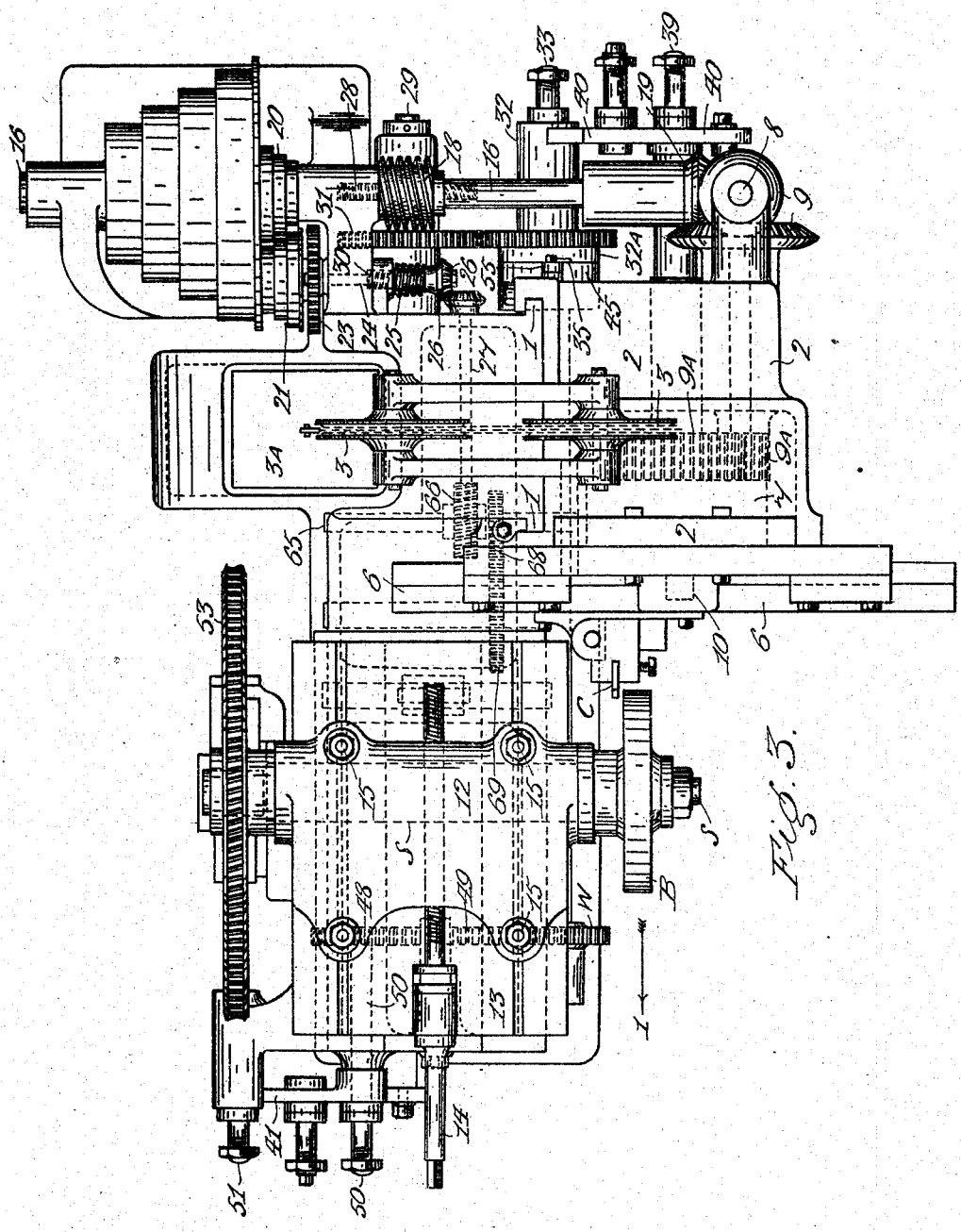
Figure 4:
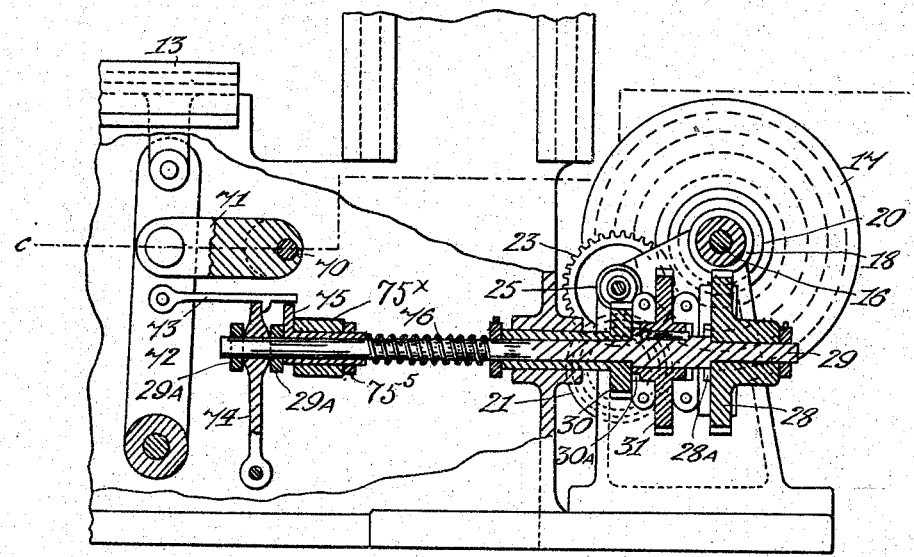
Figure 5:
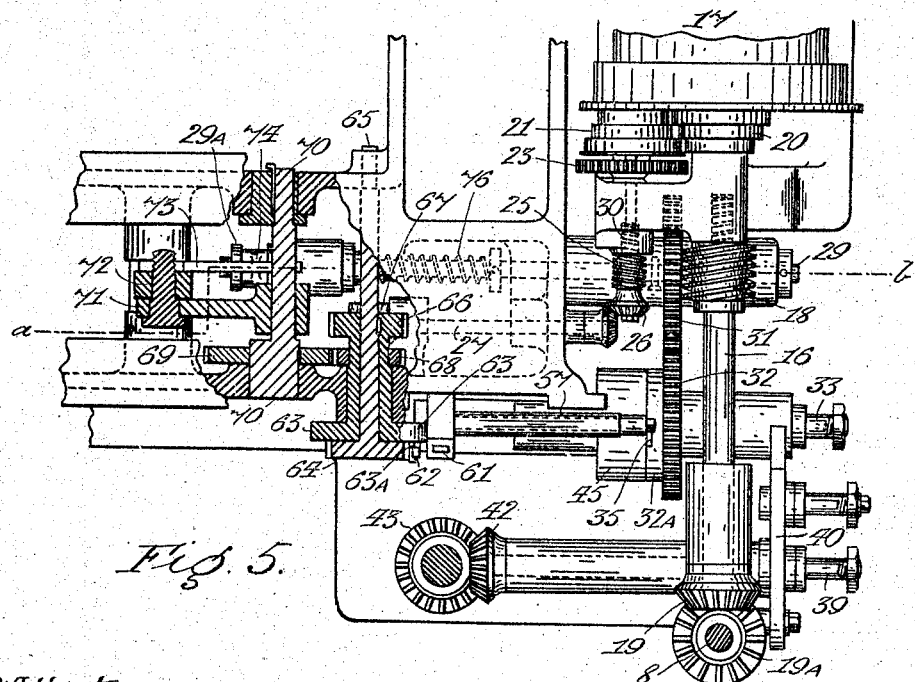

In the said drawings, Figure 1 represents a front elevation of a gear cutting machine applicable for cutting the teeth in spur and spiral toothed wheels. Fig. 2, is a side elevation. Fig. 3 a plan of machine. Fig. 4 a sectional elevation through irregular line $a$, $b$, of Fig. 5, which represents a plan through irregular line $c$, $d$, showing part in section. The following figures are drawn to a larger scale, Fig. 6 representing a detached sectional view of a spur wheel supporting a trigger, not in section, and a circular block provided with a yielding bar. Fig. 7 is a plan. Fig. 8, an elevation showing how trigger is supported. Fig. 9, a view of constantly rotating ratchet wheel, intermittently rotating disk, and vertical plate. Fig. 10 is a side elevation showing how the vertical plate is held in its suspended position. Fig. 11 a front view of the operating mechanism, inclosed within head stock for reciprocating cutter slide.

The drawings illustrate a gear cutting machine to which my invention is added, and in the machine mounted upon guide ways 1, is a sliding head stock 2, connected by chain 3 to balance weight 3$^A$, the headstock engaging with a threaded bar 4, rotated in one direction and then in the other, for the raising and lowering of headstock, as controlled in the manner hereinafter described.

Upon the face of head stock is mounted and bolted a plate 5 adapted to swivel thereon, and in guide ways 5$^A$ is placed a plate 6, to which is attached a suitable device for holding the cutter. Reciprocating motion to plate 6 and cutter C, may be obtained in any convenient manner, such as from a rotating disk 7, see Figs. 1, 2 and 3, and detached view, Fig. 11.

The rotating disk is shown as operated from shaft 8, through bevel and spur gears 9 and 9$^A$, and on the face of disk, is a stud carrying a block 10, engaging with a slot 11, formed in plate 6, see Fig. 1, so that on the rotation of disk 7, plate 6 and cutter C are reciprocated.

The gear blank B, shown by Fig. 3, is supported in the usual manner by spindle S passing through bracket 12, adapted to slide upon saddle plate 13, the bracket being capable of adjustment, on the operation of screwed bar 14, for the purpose of placing blank B in position for the reciprocating cutter C to engage therewith, the screw meshing with a suitable nut in bracket, which when adjusted, is secured to plate 13 by bolts 15.

Upon the main shaft 16, is secured a cone pulley 17, a worm 18, and a bevel wheel 19, the wheel meshing with wheel 19$^A$ keyed to vertical shaft 8. A cone pulley 20 is also secured upon main shaft, and is connected by a belt with cone pulley 21, to which is secured a pinion 22, both mounted upon a stud, the pinion meshing with spur wheel 23 keyed upon shaft 24, to which are secured a worm 25 and bevel wheel 26, the wheel meshing with a like wheel secured on shaft 27. The worm 18 meshes with wheel 28 mounted upon shaft 29, and worm 25 with wheel 30 mounted upon the same shaft, see Fig. 4, both wheels are free upon shaft 29, which is adapted to slide, and both are provided with clutch teeth which are moved out and into mesh with the respective teeth at ends of boss of spur wheel 31, according to the position in which shaft 29 is moved. The long boss of spur wheel 31, is carried by journals and is feather keyed upon shaft 29, the clutch teeth at each end of boss, are of the ordinary description, as are also the teeth at 28$^A$ and 30$^A$ on the respective worm wheels 28 and 30. The journals supporting the spur wheel 31 are of the ordinary plumber block type bolted to or forming part of the general frame of the machine.

Meshing with spur wheel 31, is a wheel 32 of less diameter, keyed upon shaft 33 by key 33ª, the wheel being provided with a ring flange 32ᴬ, see Figs. 6 and 8, and upon the boss of said wheel is freely mounted a trigger 34, projecting through slot 35 in ring flange. Between the wheel boss and ring flange is an annular space, in which is placed a spiral spring 36, held in tension by attachment to pins 37 and 38, respectively secured to trigger 34 and spur wheel 32. Shaft 33 is geared to shaft 39 by a train of change wheels not shown by drawings, but are supported in the usual well known manner by an ordinary stud plate 40. To the opposite end of shaft 39, is keyed a bevel wheel 42, meshing with a wheel 43 secured on vertical threaded bar 4, the geared connection transmitting rotary motion from shaft 33, to threaded bar 4, turning same according to the direction in which shaft 33 is rotating. In the same axial line as shaft 33, is a shaft 44, upon which is keyed a circular block 45 by key 45ª, provided with a latch ended yielding bar 46, normally held in the position as shown, by compressed spring 47, see Fig. 6, and when the rotating trigger 34 is engaged with bar 46, in the manner shown by Fig. 7, circular block 45 and shaft 44 are rotated; cutter C is then acting on the blank. Upon shaft 44 is secured a spur wheel W, meshing with wheel 48 through an intermediate wheel 49. Wheel 48 is keyed upon shaft 50, geared with shaft 51 by a suitable train of change wheels not shown by drawings, but supported in the usual manner by an ordinary stud plate 41. To shaft 51 is feather keyed a worm 52, meshing with a wheel 53 secured to spindle S, adapted to support blank B, which is caused to turn at intervals in a rotary direction.

During the time blank B is in the position for reciprocating cutter C to act thereon, trigger 34 and circular block 45 are rotated by end 35ᴬ of slot 35 engaging with said trigger, see Fig. 8, and when the end of the rotating trigger comes in contact with the notched side of arm 55, see Fig. 10, free upon an end of shaft 56 supported by bracket 57, the arm is forced in the direction of curved arrow, against lug 58 of arm 58ᴬ, secured to said shaft. The shaft is thus turned a little in the direction of the before mentioned curved arrow, causing cam 59, to force catch bar 60 clear of notch in vertical plate 61, thus allowing said plate to drop to the position shown by dotted lines in Figs. 9 and 10. When plate 61 drops, pawl 62 pivoted to disk 63, is by spring X forced into engagement with the constantly rotating ratchet toothed wheel 64, driven by shaft 65, upon which is secured a worm wheel 66 meshing with a worm 67 secured on shaft 27 below, rotated by bevel wheel 26, see Fig. 5. On each engagement of pawl 62 with ratchet wheel 64, disk 63 is caused to make one revolution, and upon the boss sleeve of said disk, is secured a spur wheel 68, meshing with a wheel 69 of double diameter, keyed upon eccentric shaft 70, so that on each revolution of disk 63, eccentric shaft 70 makes one half of a revolution. Shaft 70 is connected by a link 71 to lever 72, supported at the bottom by a shaft, and the top connected to plate 13 as shown, enabling shaft 70 on each half revolution, to force plate 13 along with blank B away from, or toward the reciprocating cutter C. On disk 63 completing one revolution, it is stopped by arm 63ᴬ on disk 63 engaging with projection 61ᴬ, by which plate 61 is lifted from the dotted position, to that shown by full lines. As plate 61 is being lifted, pawl 62 is forced out of engagement with ratchet wheel, by arm 61ᴮ coming in contact therewith, see Fig. 9, the plate when lifted being suspended by catch bar 60, as shown by Fig. 10.

In Fig. 4, the clutch teeth of worm wheel 30 are shown in mesh with the teeth at end of boss of wheel 31. Blank B is then in the position for cutter C to act thereon, and trigger 34 is between end 35ᴬ of slot, and yielding bar 46, see Fig. 7, both trigger, bar 46 and shaft 44 are thus rotated during the cutting of teeth in blank B, and elevation of cutter. When the end of the rotating trigger engages with notched edge of arm 55, it releases vertical plate 61 as before described, thus causing eccentric shaft 70 to be rotated one half of a revolution, by which blank B is forced in the direction indicated by arrow 1 in Fig. 3, clear of cutter C. By this movement, lever 72 is operated in the same direction as blank, and connected to the lever, is a hooked bar 73, shown engaged with top of lever 74, the lever being suitably supported and passing between two collars 29ᴬ, secured upon shaft 29. On plate 13 moving in the direction of arrow 1, lever 72 and shaft 29 are moved in the same direction, thereby drawing the clutch teeth of wheel 30 out of mesh, and forcing those of wheel 28 into mesh with the corresponding teeth 28ᴬ on end of boss of wheel 31, by which the rotation of shafts 29 and 33, also that of threaded bar 4, is reversed and the rotary speed increased, the head stock and cutter C being thereby lowered quickly. The reversal of rotation, causes trigger 34 to leave yielding bar 46, shaft 44 and blank B are then stationary, and on the trigger engaging with the curved edge of arm 55, it is allowed to pass, without affecting vertical plate 61, as is also the case on the trigger pressing against the angular or latch end of bar 46, the bar sliding inward, allows the trigger to pass without putting into rotation shaft 44. Spur wheel 32 and trigger 34 make about one revolution and a tenth on each reversal, and when operated by wheel 28, the trigger is drawn by spring 36, to the opposite end of slot as shown by dotted lines in Fig. 8. The reversal of rotation of wheel 32 into the direction for raising the head stock and cutter C, is accomplished in the following manner.

Cam 75 is feather keyed on rotating shaft 29, and on the cam coming in contact with hooked bar 73, it is raised clear of lever 74, thereby liberating the lever and allowing compressed spring 76 to expand, and force said shaft into the position shown by Fig. 4, the clutch teeth of wheel 30, then engaging with those at end of boss of wheel 31 said cam 75 is supported by a journal 75$^\times$ forming part of the frame of the machine, see Fig. 4. Longitudinal movement of the cam is prevented by the extension thereof engaging with one end of the journal and the collar 75$^5$ secured by any suitable means to the cam sleeve at the other end of the journal. Spur wheels 31 and 32 are then operated slowly, putting into rotation threaded bar 4 in the direction for raising headstock and cutter C, trigger 34 being then in the position shown by dotted lines, and when it engages with the notched side of arm 55, vertical plate 61 is liberated, putting into operation for one revolution disk 63, and eccentric shaft 70, one half of a revolution, thereby returning blank B into the position for reciprocating cutter C to engage therewith. When eccentric shaft 70 is operated as described, cutter C is moving upward, and spur wheel 32 continuing its rotation, the trigger being then in contact with yielding box 46, but as spring 36 is not of sufficient tension to operate shaft 44, it remains stationary until the end 35$^A$ of slot engages with trigger, see Fig. 7, when shaft 44 and blank B are put into rotary operation, at the time blank B is engaging with cutter C.

The connecting toothed wheels between shaft 44 and worm wheel 53, are so proportioned that, the rotation or movement of imaginary pitch line of blank, B, is turned in unison with the rising cutter C, until the cutter arrives in the position for trigger 34 to again operate catch bar 60, thereby liberating vertical plate 61, putting disk 63 and eccentric shaft 70 into operation, thereby moving blank B back, in the direction indicated by arrow 1 in Fig. 3, when the cycle of operations is repeated the threaded bar 4 beginning to rotate and raise the head stock 2 and cutter C before the blank B is drawn into the position shown by Fig. 3, thus removing all back lash from the driving gears between spur wheel 31 and bevel wheel 43 secured on threaded bar 4.

What I claim as my invention is:—

1. A wheel cutting machine comprising a movable saddle plate, a spindle for the blank carried thereby, a vertically movable head stock, a cutter carried thereby, a main shaft, change speed mechanism operated by the main shaft, means connected with said mechanism for slowly raising the head stock, and quickly lowering the same, means coöperating with the last mentioned means for rotating the blank spindle, means combined with the last named means for stopping the rotation of the spindle and moving the saddle plate away from the cutter, and means for operating the cutter.

2. A wheel cutting machine comprising a movable saddle plate, a spindle for the blank carried thereby, a head stock, a cutter carried thereby, means for operating the cutter, a main shaft, a shaft 33, gearing connecting said shaft 33 with the head stock to lower and raise the same, a sliding shaft 29, change speed gearing mounted on said shaft 29, gearing connecting said shaft 29 with the shaft 33 for rotating the shaft 33 in both directions, a shaft 44, detachable means connecting said shaft 44 with the shaft 33, means for connecting said shaft 44 with the blank spindle, means for disconnecting the shaft 44 when shaft 33 is reversed, means operated from the shaft 33 for forcing the blank away from the cutter and at the same time reversing the motion of the shaft 33 to lower the head stock and means for again reversing the motion of the shaft 33 to bring the parts into operative position.

3. A wheel cutter comprising a saddle plate, a blank supporting spindle carried thereby, a vertically movable head stock, a cutter carried thereby means for operating the cutter, a sliding shaft 29, change speed gearing carried thereby, a main driving shaft connected therewith, a pivoted lever 74 connected to one end of said shaft 29, a cam on said shaft and a spring for holding the shaft with the low speed gearing in operative position, a shaft 33, a gear wheel thereon in mesh with the change speed gearing whereby said shaft will be rotated in different directions and at different speeds, gearing connecting said shaft 33 with the head stock so that said head stock will be slowly raised and quickly lowered, a shaft 44 connected with the blank spindle, means for rotating the said shaft 44 from the shaft 33 when the same is on its low speed, an eccentric shaft connected with the saddle plate for reciprocating same, means controlled by shaft 33 for rotating the eccentric shaft at intervals, and a hook lever 73 connected with the saddle plate and engaging the upper end of the lever 74 so that when the saddle plate is moved away from the cutter the shaft 29 is moved in the same direction to give the shaft 33 a quick rotation in the opposite direction, the cam on said shaft 29 releasing said hooked lever 73 to permit the spring to return the shaft 29 to normal position.

4. In a wheel cutting machine, the combination with a cutter and means for operating the cutter, of mechanism for sliding a blank into contact with and clear of said cutter, said mechanism comprising a spur wheel 32, means for rotating said wheel in both directions, a trigger 34 carried by said wheel, a shaft 56 operated by said trigger in one direction, a rising and falling vertical plate 61, an arm 61$^B$ on said plate, a rotating ratchet wheel 64, a disk 63, a pawl 62 carried thereby and operated by arm 61$^B$ to connect the wheel and disk, an eccentric shaft 70 gearing between said shaft and the disk and means for connecting the blank carrying part with the eccentric shaft substantially in the manner as shown and described.

5. In a wheel cutting machine, a spindle for carrying the blank, a spur wheel 32, means for rotating said wheel in both directions, a trigger 34 carried thereby, a latch ended yielding bar 46, a shaft 44, a circular block 45 secured thereon and carrying the bar 46, geared connections between said shaft and the blank supporting spindle, the bar 46 and trigger being adapted to operate the shaft 44 when said wheel 32 is rotating in one direction, and said shaft 44 remaining stationary when the wheel 32 is rotating in the opposite direction for the purpose set forth.

6. In a wheel cutting machine, a sliding rotary shaft 29, worm wheels 28 and 30 carried thereby and provided with clutch teeth, means for rotating said wheels in opposite directions, a wheel 31 with clutch teeth at each side thereof keyed to shaft 29, a cam 75 mounted in a rigid bearing and keyed on said shaft, a saddle plate 13, a lever 72 connected to the saddle plate, a hooked bar 73 pivoted to the lever 72, a pivoted lever 74, collars 29$^A$ holding the lever in connection with the shaft 29 and a compressed spring 76 applied to the shaft whereby the shaft will be moved on movement of the saddle plate.

In witness whereof I have hereunto set my hand to this specification in the presence of two witnesses.

SAM SUNDERLAND.

Witnesses:
A. M. MIDGLEY,
JOHN GILL.